United States Patent [19]
Szczech

[11] Patent Number: 5,138,488
[45] Date of Patent: Aug. 11, 1992

[54] RETROREFLECTIVE MATERIAL WITH IMPROVED ANGULARITY

[75] Inventor: Theodore J. Szczech, Lake Elmo, Minn.

[73] Assignee: Minnesota Mining and Manufacturing Company, Saint Paul, Minn.

[21] Appl. No.: 579,566

[22] Filed: Sep. 10, 1990

[51] Int. Cl.⁵ .................................. G02B 5/124
[52] U.S. Cl. ....................... 359/529; 359/530
[58] Field of Search ............. 350/97, 102, 103, 109

[56] References Cited

U.S. PATENT DOCUMENTS

| | | | |
|---|---|---|---|
| 3,684,348 | 8/1972 | Rowland | 350/103 |
| 3,689,346 | 9/1972 | Rowland | 350/103 |
| 3,712,706 | 1/1973 | Stamm | 350/103 |
| 3,833,285 | 9/1974 | Heenan | 350/103 |
| 3,923,378 | 12/1975 | Heenan | 350/103 |
| 3,924,929 | 12/1975 | Holmen et al. | 350/103 |
| 4,202,600 | 5/1980 | Burke et al. | 359/530 |
| 4,588,258 | 5/1986 | Hoopman | 350/103 |
| 4,775,219 | 10/1988 | Appeldorn et al. | 350/103 |
| 4,895,428 | 1/1990 | Nelson et al. | 350/103 |
| 4,938,563 | 7/1990 | Nelson et al. | 350/103 |

Primary Examiner—Bruce Y. Arnold
Assistant Examiner—James Phan
Attorney, Agent, or Firm—Douglas B. Little; Gary L. Griswold; Walter N. Kirn

[57] ABSTRACT

The present invention provides an improved cube-corner retroreflective article that exhibits a wide range of retroreflective angularity in multiple viewing planes. The present invention provides cube-corner retroreflective elements having a decreased size, as measured by the height of the cube corner, thereby decreasing the amount of canting required to achieve a given angularity. Alternatively, angularity can be enhanced by leaving the degree of canting constant and decreasing the size of the cube corner.

9 Claims, 8 Drawing Sheets

RETROREFLECTIVE MATERIAL WITH IMPROVED ANGULARITY

TECHNICAL FIELD

The present invention is directed to a cube-corner retroreflective article, and is particularly directed to such articles that have improved brightness at high angles of incidence.

BACKGROUND OF THE INVENTION

Cube-corner retroreflective materials are used extensively in highway signs, street signs, and pavement markers. The retroreflective material is characterized by its ability to reflect light back towards the source of a non-perpendicular incident ray. Retroreflection can be distinguished from specular reflection (i.e., mirrors), or from diffuse reflective sources, that scatter the incident light in all directions.

The reflected light from a retroreflective article generally spreads as it leaves the article into a cone-like pattern centered on the path the light travelled to the reflective article. Such spreading is necessary for practical utility of the reflective article. As an example, the light from the headlights of an oncoming vehicle, reflected back towards the vehicle by a retroreflective sign, must diverge sufficiently to reach the eyes of the driver, who is positioned off-axis from the headlight beam. In conventional cube-corner retroreflective articles, this cone-like spreading of retroreflective light is obtained through imperfections in cube-corner retroreflective elements (e.g., non-flatness of the faces, tilting of faces from their mutually perpendicular positions, etc.), and through diffraction caused because light exits through an aperture defined by the base edges of the three reflecting faces (See, Stamm U.S. Pat. No. 3,712,706).

Because a road sign or the like is viewed from a multitude of relative positions (curves in the road, etc.) the angle of incidence (entrance angle of the light, see FIG. 11) is often greater than optimum. Cube-corner type retroreflective materials typically exhibit progressively less reflectivity as the entrance angle of viewing light is increased. Often, such materials lose significant amounts of reflectivity at entrance angles of greater than about 20 degrees, and may lose nearly all of their reflectivity when the entrance angle becomes greater than about 40 degrees. The entrance angle of the incident light is measured from the line perpendicular to the surface of the retroreflective sheeting material.

Cube-corner retroreflective elements inherently have low angularity, i.e., poor retroreflective performance beyond low entrance angles. Cube-corner retroreflective elements used in retroreflective sheeting are trihedral structures having three mutually perpendicular lateral faces, such as the three mutually perpendicular lateral faces that occur at the corner of a cube. In use, the elements are arranged so that light to be retroreflected impinges into the internal space defined by the faces, and retroreflection of the impinging light occurs by total internal reflection (T.I.R.) of the light from face to face of the element. Impinging light that is inclined substantially away from the optical axis of the element (which is the trisector of the internal space defined by the faces of the element) strikes a face at an angle less than the critical angle for T.I.R., thereby passing through the face rather than being reflected.

Retroreflected articles having improved angularity along multiple viewing planes are described in U.S. Pat. No. 4,588,258 (hereinafter "the '258 patent"). The retroreflected elements described in the '258 patent are canted to improve the angularity of the retroreflective material. However, as canting is increased, the percentage of light returned (as measured at near normal incidence) is decreased. Thus, in obtaining a given amount of light return, as required for adequate performance in a particular setting, there are limits on the degree to which canting can be used to improve angularity. Accordingly, in situations where angularity is particularly important, such as in an urban setting or on a winding road, angularity must be maximized without allowing brightness to fall below a threshold level.

Accordingly, there is a need for a retroreflective article that exhibits extremely high angularity, that is particularly adapted for use in an urban setting or on a winding road, but which also has adequate brightness over the viewing distance of the sign.

DISCLOSURE OF THE INVENTION

The present invention provides an improved cube-corner retroreflective article that exhibits a wide range of retroreflective angularity in multiple viewing planes. The present invention provides cube-corner retroreflective elements having a decreased size, as measured by the height of the cube corner, thereby decreasing the amount of canting required to achieve a given angularity. Alternatively, angularity can be enhanced by leaving the degree of canting constant and decreasing the size of the cube corner.

The retroreflective elements of the present invention comprise at least one matched pair of cube-corner retroreflective elements, comprising three mutually perpendicular lateral faces that meet at an apex, the mutually perpendicular lateral faces of each element being defined at their bases by linear edges that lie in a common base plane. The elements are rotated 180° with respect to one another. Each retroreflective element has a height "h", measured from the base plane to the apex of the element along a line perpendicular to the base plane. The optical axis of each element of the pair is tilted toward the one edge (or vertex of that element at an angle alpha from the line perpendicular to the common base plane. The optical axis of each element is tilted (canted) at an angle, alpha, typically about two to seven degrees, preferably two to five degrees. The height "h" of the retroreflective elements of the present invention are reduced from that of commercially available canted retroreflective elements so that angularity is enhanced and/or brightness is increased.

Preferably the height "h" is about 150 $\mu$m or less, more preferably about 25 to 100 $\mu$m, most preferably about 50 to 100 $\mu$m. Preferred angles of cant and heights of cube-corner elements are for elements having an index of refraction of about 1.6.

A BRIEF DESCRIPTION OF THE DRAWINGS

DETAILED DESCRIPTION

The retroreflective elements of the present invention have the basic structure of those taught in U.S. Pat. No. 4,588,258 (the '258 patent), incorporated herein by reference. However, retroreflective elements of the present invention are smaller in size than those described in the '258 patent. The smaller size permits the elements of the present invention to be canted less than those described in the '258 patent. The '258 patent describes the preferred cant to be "between about 7 and slightly less then 10 degrees" (Col. 3, lines 29-30).

Figure 1:
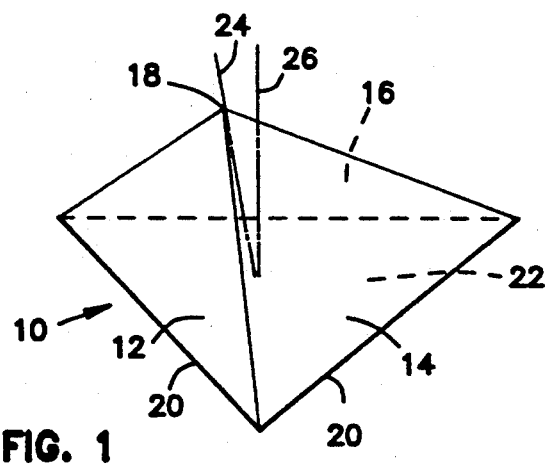
FIG. 1 is a perspective view showing a cube-corner retroreflective element used in retroreflective articles of the invention.
Figure 2A:
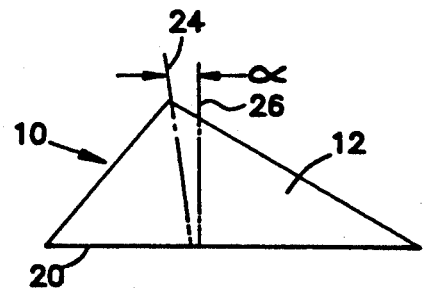
FIGS. 2A, 2B, 2C are side elevational views of the lateral faces of the cube corner element shown in FIG. 1.
Figure 2B:
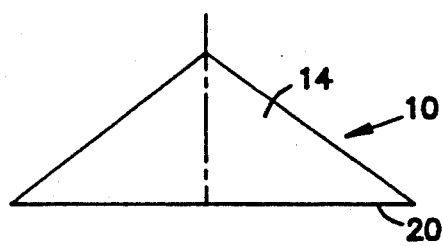
Figure 2C:
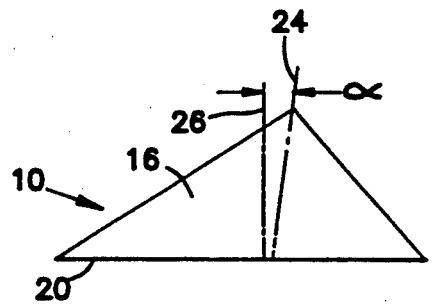

Referring to FIG. 1, a cube-corner retroreflective element useful in retroreflective sheeting of the present invention is shown. A side elevational view is shown in FIGS. 2A, 2B, and 2C. As shown, the element 10 has three mutually perpendicular lateral faces 12, 14, and 16, which meet at an apex 18. The base edges 20 of each of the lateral faces 12, 14, and 16 are linear and lie in a base plane 22 of the element. The element 10 also includes an optical axis 24, which is a trisector of the internal angle defined by the lateral faces 12, 14, and 16. The optical axis 24 is tilted or canted with respect to the perpendicular line 26 that is perpendicular to the base plane 22. The degree of canting is represented by the angle, alpha, between the optical axis 24 and the perpendicular line 26 (see FIGS. 2A and 2C). Light incident on the base plane 22, is internally reflected by one of the three lateral faces to a second face, then to a third face, and then back through the base plane 22, and retroreflected back toward the source of light.

Figure 3:
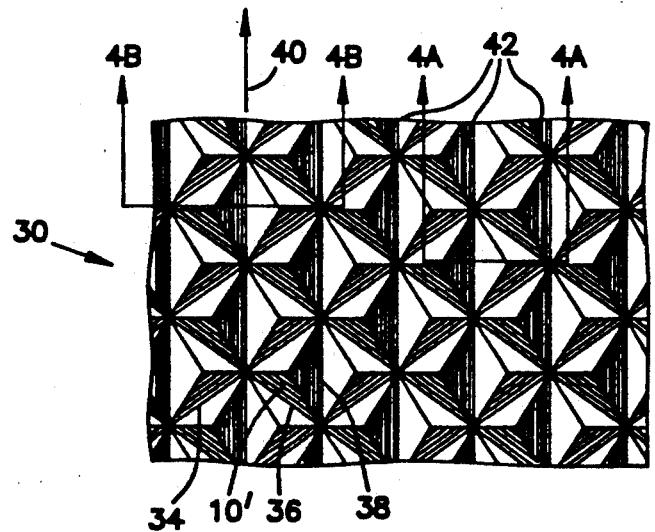
FIG. 3 is a plan view of retroreflective sheeting of the invention with a dense array of cube-corner elements as pictured in FIGS. 1 and 2.
Figure 4A:
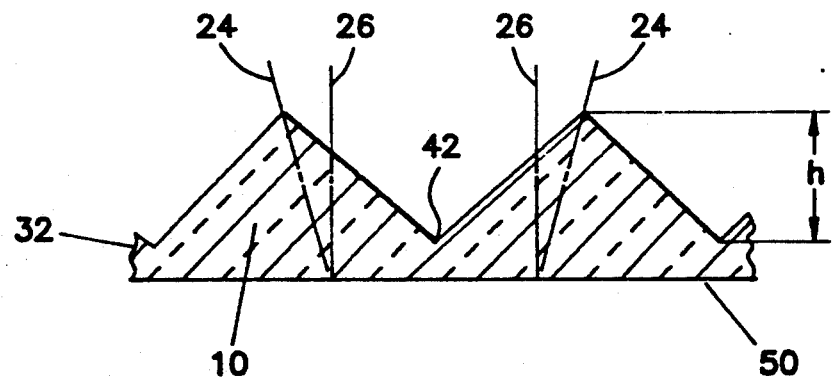
FIGS. 4A and 4B are sectional views taken along the lines 4A—4A and 4B—4B of FIG. 3 showing two representative matched pairs of cube-corner elements in retroreflective sheeting of the invention.

In retroreflective sheeting of the invention, a cube-corner element as shown in FIGS. 1 and 2 is generally used with at least one other cube-corner element as part of a matched pair, and typically as a part of an array of rows and columns of such pairs of elements. An array of elements is shown in plan view in FIG. 3. FIG. 3 depicts the back of a portion of a representative retroreflective sheeting 30 of the invention. The elements are joined together, e.g., by being formed as a part of a single integral sheet material, or by being attached at their base plane 22 to a base film 32 (FIG. 4A). Because the base edges 20 of the elements 10 are linear and in a common plane (base plane 22), an array of such elements is defined by intersecting sets of grooves. Element 10' in FIG. 3 is defined by three V-shaped grooves 34, 36, and 38, which are each one member of three sets of grooves which cross the array in an intersecting pattern. The arrow 40 represents the direction of the primary grooves 42 (groove 38 is a member of the set of primary grooves 42). The elements 10 are canted with respect to the primary grooves 42, being tilted towards or away from the respective primary groove.

FIG. 4 shows in sectional view a portion of the article pictured in FIG. 3, and shows the base film 32 connecting the elements 10 together. The elements 10 have a height "h" as shown in FIG. 4A.

Figure 4B:
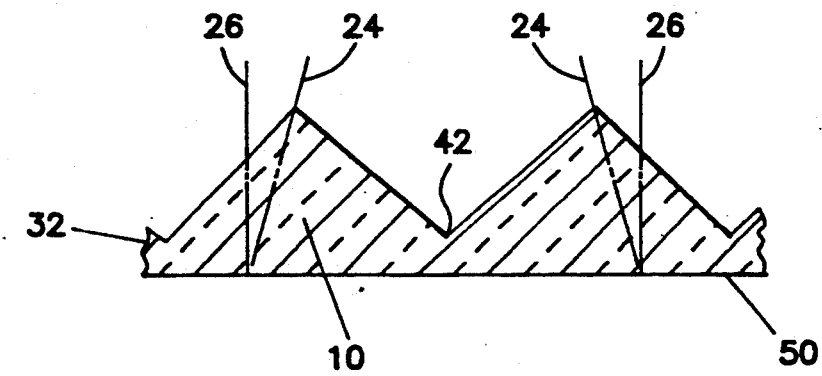

As seen from FIGS. 3, 4A, and 4B the cube-corner elements 10 can be considered as being arranged in pairs, with the optical axes 24 of the elements in each pair being tilted or canted toward one edge of the elements, when considered from the front surface 50 of the article 30 on which light to be retroreflected impinges. The optical axes 24 is tilted towards or away from the primary groove 42.

Referring to FIGS. 5-8, isobrightness curves for various retroreflective sheetings described below (Comparative Example A and Examples 1-3) are shown. The orientation angle of the measured isobrightness varies 360° from zero degrees clockwise to 90°, 180°, 270°, and beyond. The concentric circles indicate each 15° increase of the entrance angle (incident angle) of the light being reflected. These concentric circles represent entrance angles of 15°, 30°, 45°, and 60°. Sixty degrees represents the maximum capability of the machine used for testing. The isobrightness curves plotted and labelled, 10%-90%, represent the percentage of the maximum brightness (candelas/lux/m$^2$). By way of example, referring to FIG. 5, at a 0° orientation angle, and a 30° entrance angle, between 50% and 60% of the maximum light return are retroreflected.

Figure 9:
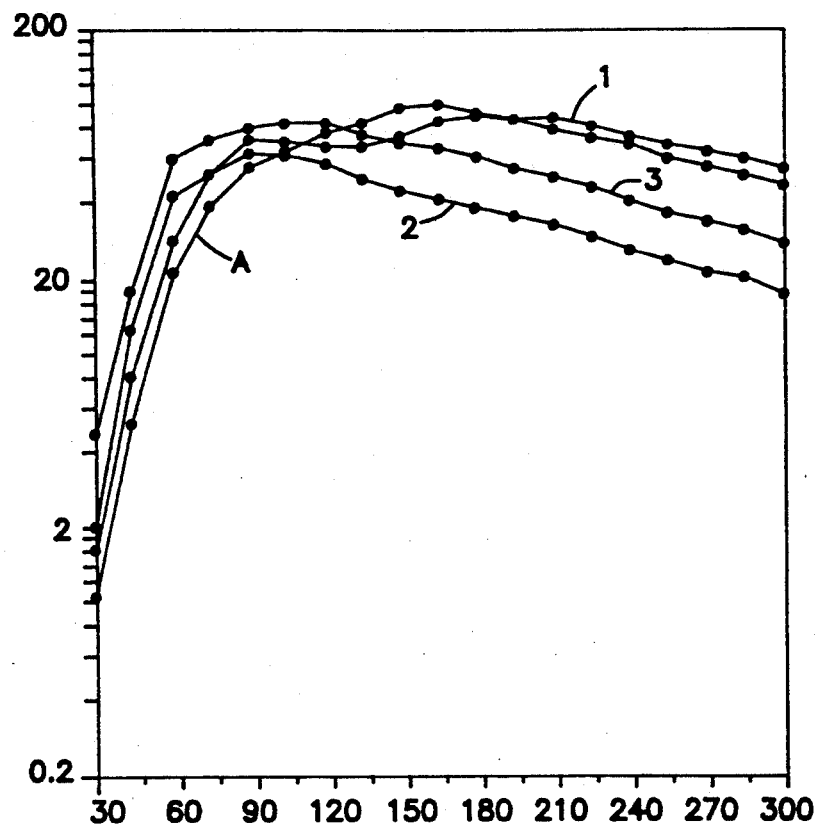
FIG. 9 is a graph of luminance versus distance for the reflective sheetings depicted in FIGS. 5-8.
Figure 10:
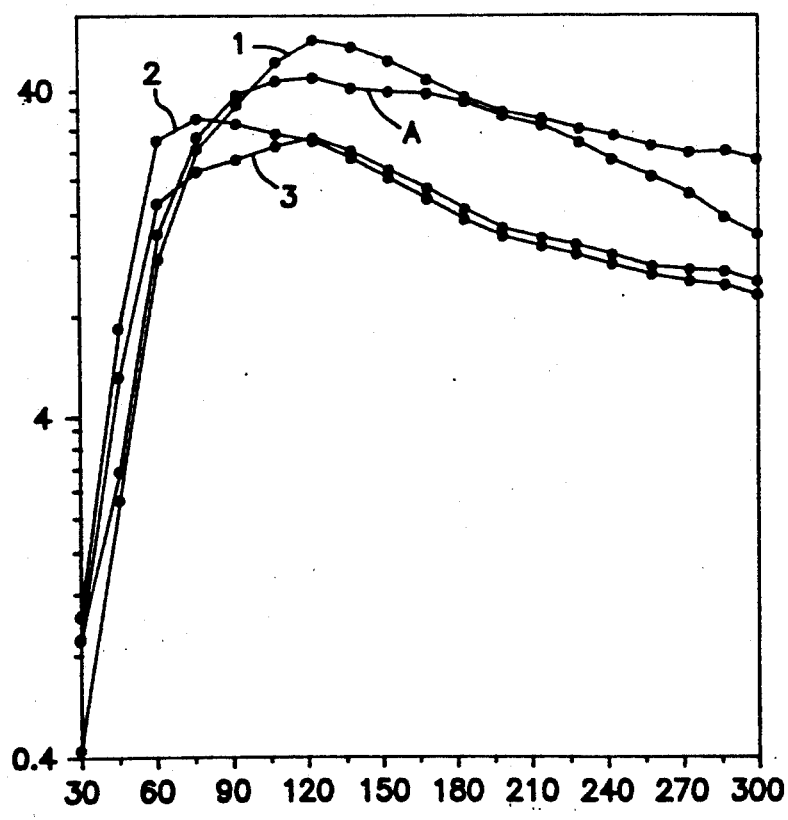
FIG. 10 is a graph of luminance versus distance for the reflective sheetings depicted in FIGS. 5-8.

Referring to FIGS. 9 and 10, the luminance for the sheetings of Comparative Example A and Examples 1-3 are plotted against distance (meters). The curves for the respective Examples are identified as "A", "1", "2", and "3". The plot for FIG. 9 is for a 90° orientation, 0° twist (sign face positioned at 93° to the road direction), right shoulder sign, in rural ambient illumination, standard sedan, Ford Taurus headlamps. Distance is measured in meters on the X-axis and luminance is measured in candelas/m$^2$ on the Y-axis. FIG. 10 shows a luminance curve similar to FIG. 9 for a sign face positioned at 128° to the road direction (35° twist).

Figure 11:
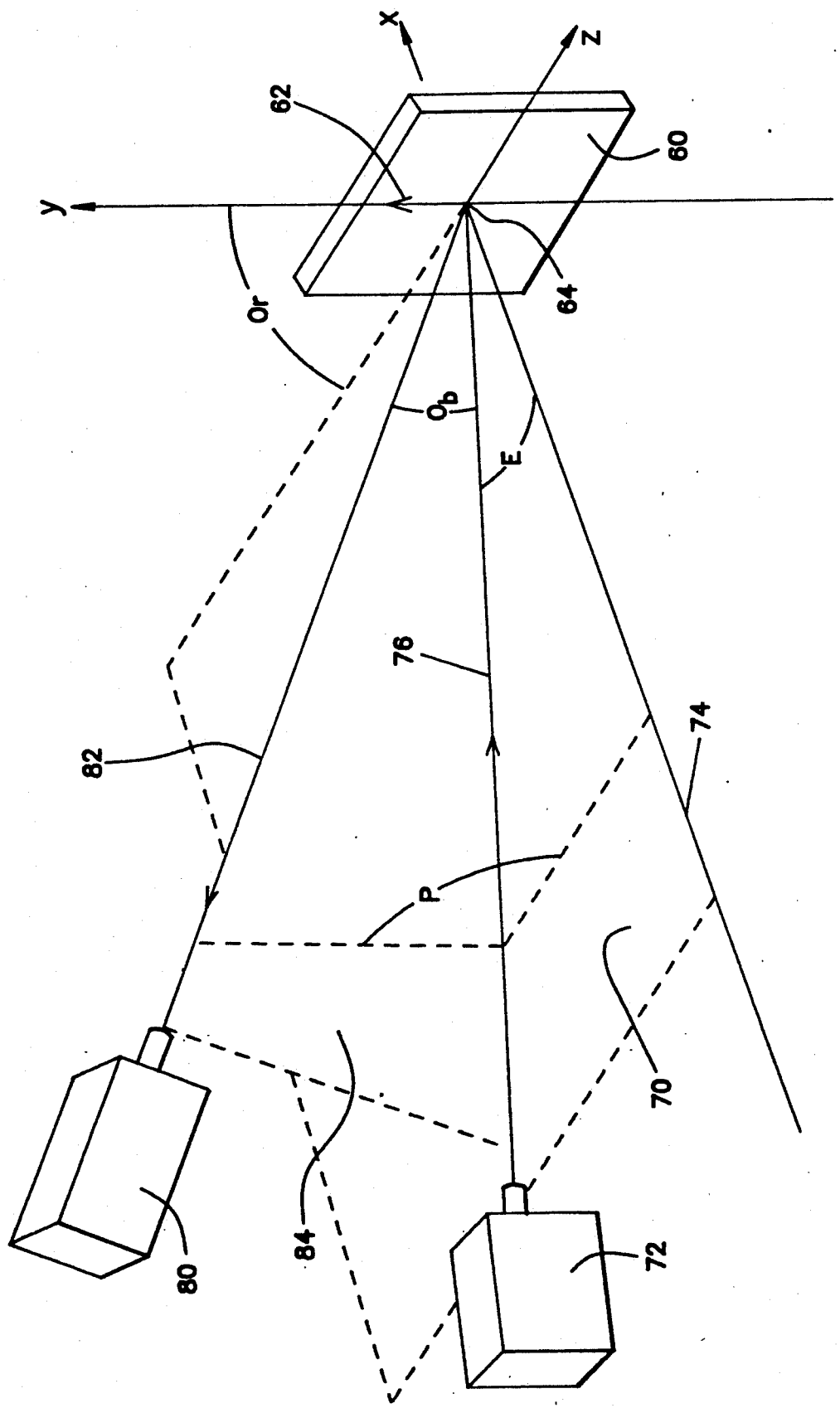
FIG. 11 is a schematic drawing depicting the devices, angles, and axes used to measure parameters of reflective materials.

Referring to FIG. 11, a schematic drawing of the devices, angles, and axes of United States Federal Test Method Standard 370 is shown. The sheeting 60 is positioned such that the primary groove (42 in FIG. 3) runs in a vertical direction. A datum mark 62 is marked on the sheeting 60 so as to indicate the direction of primary grooves 42. An indicia mark 64 is marked at the center of the sheeting 60, and is the point at which the light impinges on the sheeting. The Y-axis is parallel to the primary grooves. The X-axis is perpendicular to the plane of the sheeting, and is in the same plane as, or in a parallel plane to, the plane of the cant of the retroreflective elements. The Z-axis runs through the sheeting, perpendicular to the Y-axis. An entrance plane 70 includes a light source 72, a reference axis 74, the indicia mark 64, and an axis of incident light 76. The reference axis 74 is perpendicular to the plane of the sheeting material 60, extending from the indicia mark 64. The axis of incident light 76 is the line along which the light travels from the source 72 to the indicia mark 64. A photoreceptor 80 measures the retroreflected light that travels from the sheeting 60 along an observation axis 82 to the photoreceptor 80. An orientation angle, $O_r$, is the angle between the entrance plane 70 and the Y-axis, or the primary grooves 42. An observation angle, $O_b$, is the angle between the observation axis 82 and the axis of incident light 76. An entrance angle, E, is the angle between the axis of incident light 76 and the reference axis 74. A presentation plane 84 is a plane including the observation axis 82 and the axis of incident light 76. An angle, P, is the angle between the presentation plane 84 and the entrance plane 70.

The '258 patent defines the X-axis plane as the plane or parallel planes in which the tilting of the optical axis of the elements occurs (Column 5, lines 14-17). The Y-axis plane is defined as a plane perpendicular to the X-axis plane and the base plane of the elements (Column 5, lines 50-52). The '258 patent reports that the sheeting has a broadened angular range in the X-axis plane, as well as an increase in angular range in the Y plane (See FIGS. 5 and 6 of the '258 patent). An example of sheeting according to the '258 patent is 3M diamond grade sheeting (having a cant of 9.2°, a cube height of 175 μm, and nonorthogonal errors of 2.3 and 5 minutes) as described in Comparative Example A below.

The smaller and less canted cubes (e.g., 4.3° cant, 87.5 μm height), of the present invention demonstrate a broadening of the improved angularity ranges demonstrated near 90° and to 270°, and near 0° and 180° orientation. These shoulders of angularity, or a broadening of the improved angularity, near the 90°-270° and the 0°-180° orientations, is shown, for example, by comparing FIG. 5 (prior art) with FIG. 8.

Thus, within about 0°-20° of the most preferred orientations (90°, 270°) and next most preferred orientations (0°, 180°) improved angularity performance is also shown. This broadening of the improved response (broadened shoulders) is important because, for example, a pair of headlights on a standard sedan actually strike an intended 90° right shoulder sign at an orientation angle of about 104° to 109°.

Figure 5:
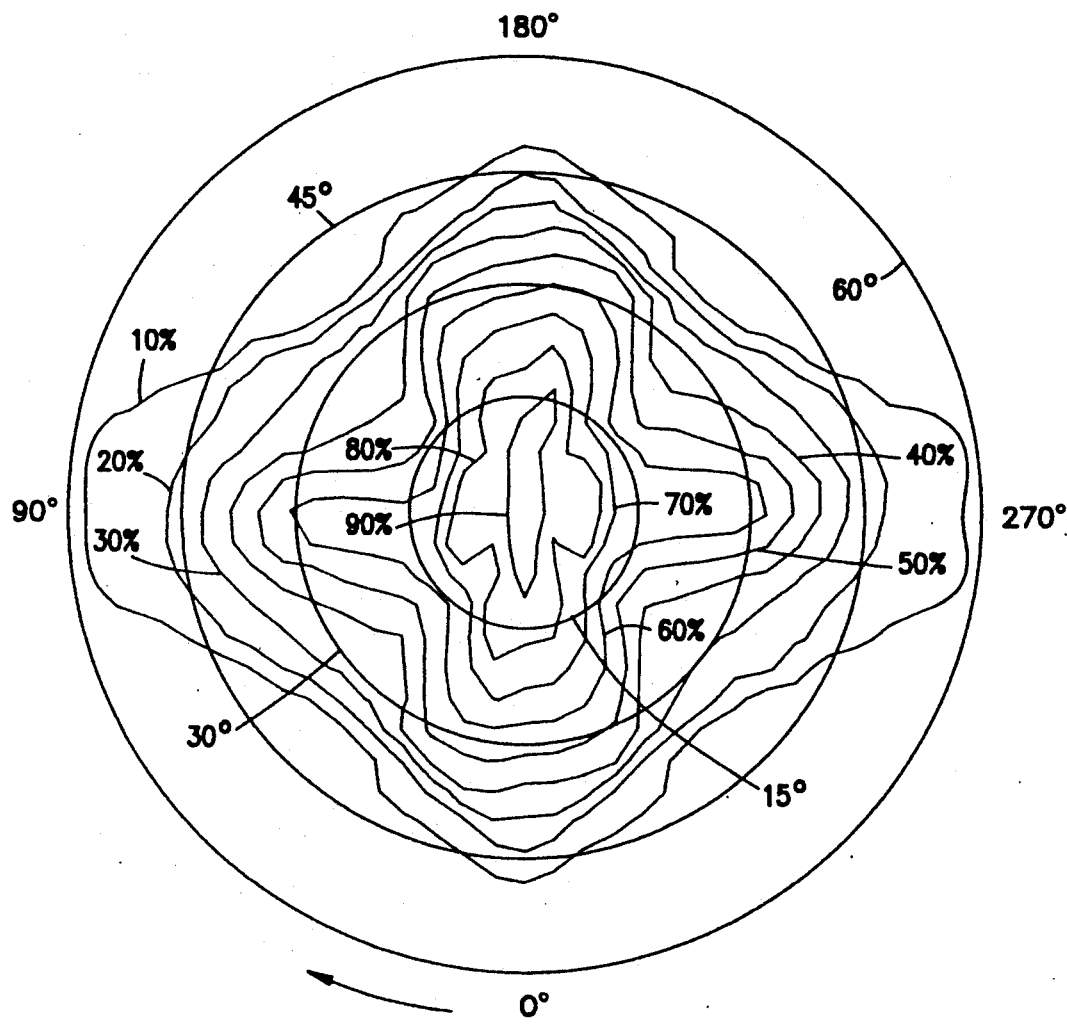
FIG. 5 is a graph of isobrightness curves measured for reflective sheeting of the prior art.

This result is further illustrated in FIGS. 5-8 which are sets of isobrightness curves for articles of the invention (FIGS. 6-8), as compared to articles of the prior art (FIG. 5).

The retroreflective sheeting described in the isobrightness curves of FIGS. 5-8 are described in Comparative Example A, and Examples 1-3, respectively. FIGS. 5-8 were all measured at a 0.20° observation angle, and a 0° presentation angle (see FIG. 11). The angle of cant (alpha), cube-height (h), half groove angle error, and maximum brightness are summarized in Table 1 below. The isobrightness lines represent a percentage, e.g., 10%, of the maximum brightness as set forth in Table 1.

TABLE 1

| FIG. | Angle Alpha | Cube Height (h) | Half Groove Angle Error | Max. Brightness (candelas/lux/m²) |
|---|---|---|---|---|
| 5 | 9.2° | 175 μm | 2.3, −5 minutes | 1254.00 |
| 6 | 8.2° | 87.5 μm | 1, −3 minutes | 1464.00 |
| 7 | 9.2° | 87.5 μm | 4.6, −10 minutes | 285.00 |
| 8 | 4.3° | 87.5 μm | 4.6, −10 minutes | 605.00 |

Referring to FIG. 5, the prior art cube corner sheeting depicted demonstrates good angularity when the sheeting is oriented on a road sign to take advantage of angularity at 90° and 270° orientation in the plot shown in FIG. 5. The apparent brightness or luminance of a sign made from this sheeting oriented to give maximum angularity was calculated for a right shoulder sign position, Ford Taurus vehicle, at distances of 300 to 30 meters from the sign.

The brightness values for this sheeting are plotted in FIG. 9 (curve A). FIG. 9 depicts luminance versus distance for a maximum orientation, 0° twist, right shoulder sign in rural ambient illumination, standard sedan, Taurus headlamps. Distance is measured in meters on the X-axis and luminance is measured in candelas/m² on the Y-axis.

The sheeting is bright from 300 to 120 meters, but falls off rapidly in the region of 120 to 30 meters. In FIG. 9, the calculation is for a sign whose face is positioned nearly perpendicular to the road direction (93°).

The angularity can be demonstrated by twisting the sign mount to increase the angle at which headlamp light impinges on the sign (entrance angle). FIG. 10 shows a luminance curve similar to FIG. 9 for a sign face positioned at 128° to the road direction (35° twist). The plot for Comparative Example A shows that the brightness has fallen off considerably.

Figure 6:
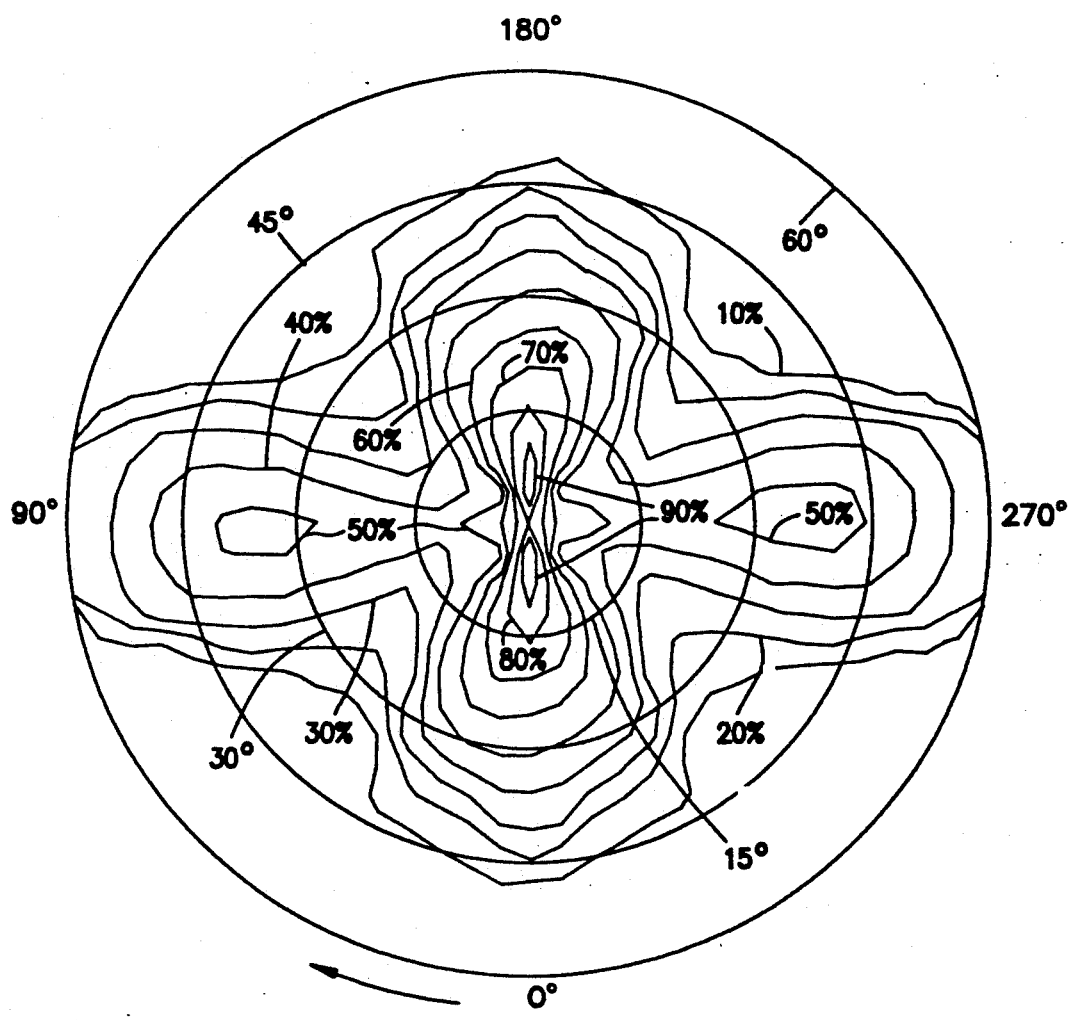
FIG. 6 is a graph of isobrightness curves measured for a representative retroreflective sheeting of the invention.

Referring to FIG. 6, a graph of isoretroreflectance for sheeting of the invention described in Example 1, supra, is shown. The 90° and 270° lobes extend beyond 60° (exceeding the instruments measurement capabilities). The 30% line is at about the same location as the 10% line for Comparative Example A (FIG. 5). This demonstrates that the smaller cube corners have redistributed the light, so that even though the canting of Example 1 sheeting is less than that of Comparative Example A, the angularity for the properly oriented sign is improved.

The luminance curves shown in FIGS. 9 and 10 further illustrate the benefits of smaller cubes. FIG. 9 shows the luminance curves of Comparative Example A and Example 1 to be very similar. However, in FIG. 10, when the sign mount is twisted 35° to, increase the entrance angle by 35°, the luminance curve of Example 1 is significantly better than that of Comparative Example A from 300 meters to 90 meters. Thus, the performance of the sheeting of the present invention has been improved over 65% of the viewing range even though the cubes were canted less than those for the prior art sheeting.

In these two examples, luminance calculations were done for a right shoulder sign and sign position angle was limited to values between 93° and 128° as these conditions include the majority of road signs. In FIG. 6 the 10% and 20% contours are not continuous at 60° because the measurements reached the limit of the instrument on which data was taken.

Figure 7:
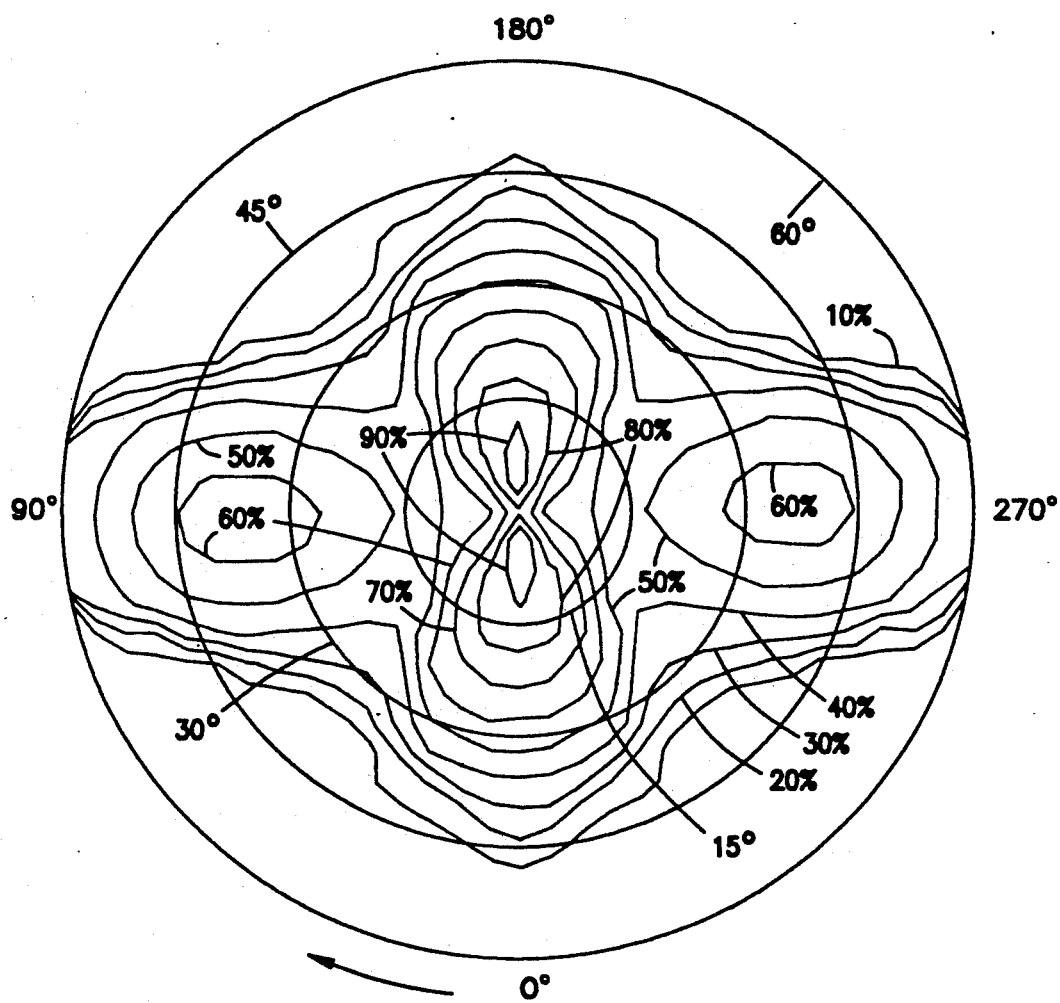
FIG. 7 is a graph of isobrightness curves measured for a representative retroreflective sheeting of the invention.

A graph of isoretroreflectance for the sheeting, described in Example 2 is shown in FIG. 7. Comparing FIGS. 5, 6, and 7 it is seen that the angularity of this sheeting near orientation angles of 90° and 270° is considerably better than that of Comparative Example A and slightly better than that of Example 1. FIG. 9 shows Example 2 to have a lower brightness from 300 meters to 75 meters. However, from 75 meters to 30 meters the brightness of Example 2 exceeds that of either Comparative Example A or Example 1. This close-in improvement is highly desirable. FIG. 10 shows Example 2 to have adequate performance for a sign position angle of 128° (35° twist).

The data in FIG. 7 shows that sheeting of Example 2 would perform better than sheeting of Comparative Example A or Example 1 if the sign is twisted beyond 35°.

The sheeting of Example 3 illustrates how the improved angularity of small cube corners has been utilized to improve performance under the widest range of conditions.

Figure 8:
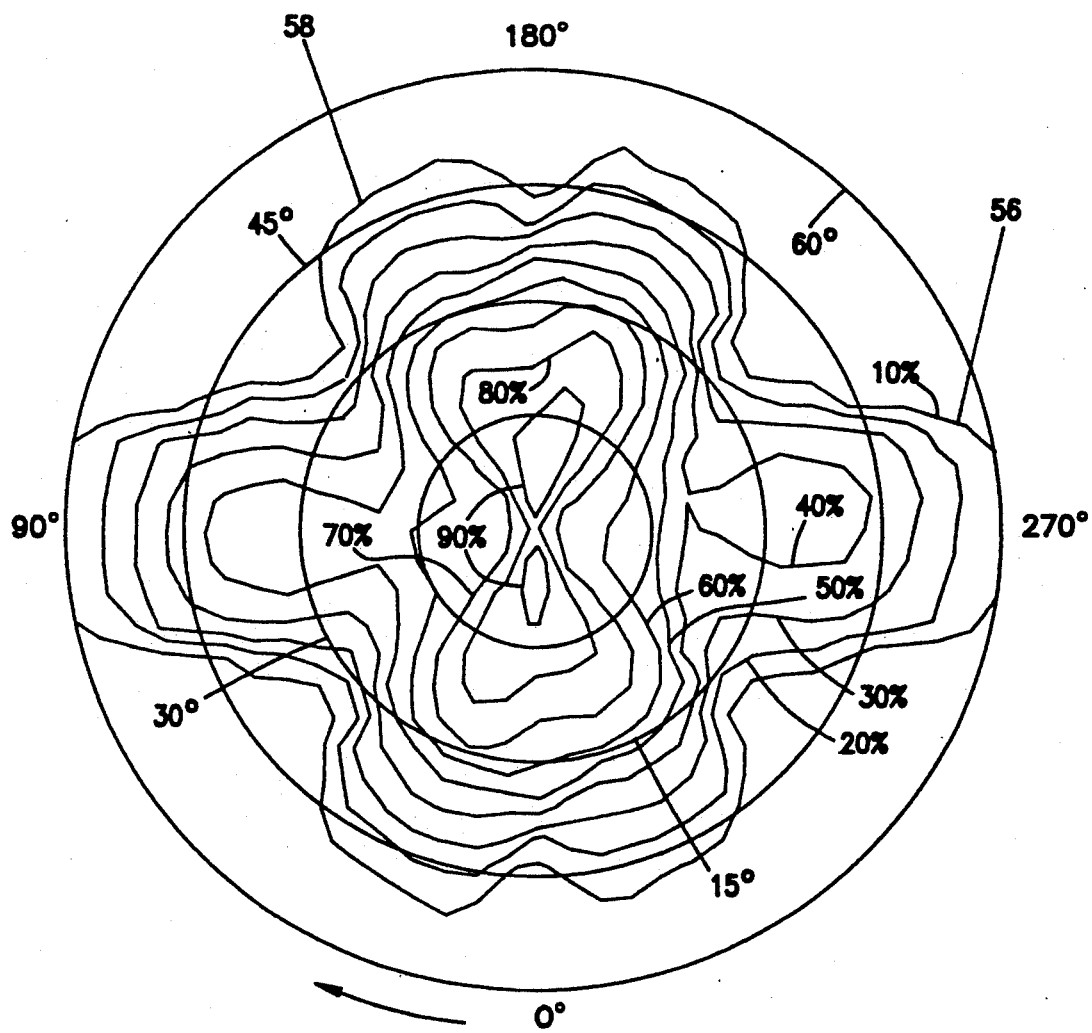
FIG. 8 is a graph of isobrightness curves measured for a representative retroreflective sheeting of the invention.

The isoretroreflectance plot for Example 3 is shown in FIG. 8. Surprisingly, the plot is an improvement over that for Comparative Example A as it is less sensitive to orientation angle. As is shown in FIG. 8, the improved angularity at 90°, 180°, 270°, and 0°, extends for orientation angles on either side of these four orientation angles. For example, the shoulders 56 and 58 in FIG. 8 depict good angularity at angles 10°-20° from 270° and 180°, respectively. Thus, a sign that is intended to be viewed at an orientation angle of 270° will also be effective if it is actually viewed at slightly different orientation angles. In this manner, the isoretroreflectance response for Example 3, depicted in FIG. 8, is less sensitive to orientation angle.

The luminance curve for Example 3 is shown in FIG. 9. This sheeting differs from the other sheetings in that there are no weak regions of performance. Most importantly, from 120 to 30 meters, Example 3 sheeting significantly out-performs the other sheetings.

FIG. 10 shows the performance at 35° twist. This figure shows a small sacrifice in performance compared to Example 2 from 120 to 30 meters in order to obtain the performance at 0° twist, a situation of much more frequent occurrence.

The sheeting of Example 3 demonstrates that smaller cube corners with reduced canting can provide: a) an angularity response directed where it is most useful; b) a uniform luminance response throughout normal viewing distances of signs (30 to 300 meters); and c) while still providing adequate angularity for high entrance angle sign placements.

Reflective sheeting of the invention may be made as one integral material, e.g., by embossing a preformed sheet with a described array of cube-corner elements, or casting a fluid material in to a mold; or they may be made as a layered product, e.g., by casting the elements against a preformed film as taught in U.S. Pat. No. 3,684,348, or by laminating a preformed film over the front face of individual molded elements. For example, effective sheeting of the invention may be made with a nickel mold, made by electrolytic deposition of nickel onto a grooved plate. The electroformed mold may be used as a stamper to emboss the pattern of the mold onto a polycarbonate film (e.g., 500 μm thick, having an index or refraction of about 1.59). The mold may be used in a press with the pressing done at a temperature of about 175°-200° C.

Useful materials for making the cover sheet and reflective elements, are preferably materials which are dimensionally stable, durable, weatherable, and readily formable into the desired configuration. Examples of suitable materials include acrylics, which generally have an index of refraction of about 1.5, such as Plexiglas resin from Rohm and Haas; polycarbonates, which have an index of refraction of about 1.6; polyethylene-based ionomers (marketed under the name of "SURLYN"); polyesters; and cellulose acetate butyrates. Generally any transparent material that is formable, typically under heat and pressure, may be used. The cover sheet may also include UV absorbers or other additives as needed.

A suitable backing layer may be made of any transparent or opaque material, including colored or non-colored materials, which can be sealingly engaged with the retroreflective elements 10. Suitable backing materials include aluminum sheeting, galvanized steel, polymeric materials, such as polymethyl methacrylates, polyesters, polyamides, polyvinyl fluorides, polycarbonates, polyvinyl chlorides, and a wide variety of laminates made from these and other materials.

The backing layer or sheet may be sealed in a grid pattern or in any other suitable configuration to the reflecting elements. Sealing may be affected by use of a number of methods, including ultrasonic welding, adhesives, or by heat sealing at discrete locations on the array of reflecting elements (see, for example, U.S. Pat. No. 3,924,928). Sealing is desirable to prevent entry of soil and moisture and to preserve the air spaces around the cube corner reflecting surfaces.

If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and release sheet to render it useful for application to any substrate without the added step of applying an adhesive or using other fastening means.

The retroreflective elements of the present invention may be individually tailored so as to distribute light retroreflected by the articles into a desired pattern or divergence profile, as taught by U.S. Pat. No. 4,775,219 (see also the related European patent application No. 0 269 329). Typically the half groove angle error intentionally introduced will be less than ±20 arc minutes, and often less than ±5 arc minutes.

The tilts in the angles of the faces to form non-orthogonal corners may be included in sets or repeating patterns, divided into repeating sub arrays. The overall pattern of light retroreflected by an article, i.e., the divergence profile of the article, comprises the summation of the different light patterns in which the sub-arrays retroreflect incident light. Individual distinctively shaped light patterns can be selected to give the overall pattern a desired shape or contour. Alternatively, the error may be randomly distributed throughout the array.

COMPARATIVE EXAMPLE A

A retroreflective sheeting of the prior art was molded from a nickel mold. The optical axes of the cube corner elements were tilted (alpha) at 9.2° and the groove angles of this sheeting departed from the values giving orthogonal dihedral angles by +2.3 and −5 arc minutes, as described in the above-referenced patent. The cube corners described in this invention are truncated as opposed to full cube corners made from pin bundles. The height of the truncated cube corners, "h", is measured from the base to the apex. The height of the cube corner elements described in this example was 175 μm.

EXAMPLE 1

Retroreflective sheeting of the present invention was made in a manner similar to that described for the sheeting in comparative Example A. The sheeting of Example 1 has the cube corner heights of only about 87.5 μm, the groove angles depart from those giving orthogonal dihedral angles by +1 and −3 arc minutes in the same pattern as in Comparative Example A. The angle alpha (cant) was 8.2°.

EXAMPLE 2

Retroreflective sheeting of the present invention was made in a manner similar to that described in Comparative Examples A. The cube corner height, h, was 87.5 μm. The groove angles giving orthogonal dihedral angles were +4.6 and −10 arc minutes in the same pattern as the previous examples. The optical axes of the cube corner elements were tilted at an angle, alpha, of 9.2°.

EXAMPLE 3

Retroreflective sheeting of the present invention was made in a manner similar to that described for the sheeting in comparative Example A. The groove angle departed from those giving orthogonal dihedral angles by 4.6 and −10 minutes. The sheeting of Example 3 had an angle, alpha of only 4.3°, and a height, h, of 87.5 μm.

I claim:

1. A retroreflective article comprising:
   at least one pair of cube-corner retroreflective elements, comprising three triangular and substantially mutually perpendicular lateral faces that meet at an apex, said mutually perpendicular lateral faces of each element being defined at their bases by linear edges that lie in a common base plane; adjacent pairs of said elements rotated 180 degrees with respect to one another;
   each retroreflective element having a height "h", measured from the base plane to the apex of the element along a line perpendicular to the base plane, h being less than about 150 μm; and
   the optical axis of each element of the pair being tilted toward one edge of that element from the line perpendicular to said common base plane at an angle, alpha, wherein alpha is about 2° to 5°.

2. The retroreflective article of claim 1 in which the height "h" is about 25 μm to 100 μm.

3. The retroreflective article of claim 2 in which the height "h" is about 50 μm to 100 μm.

4. The retroreflective article of claim 1 wherein at least one of said elements has half groove angle errors of about 20 arc minutes or less distributed in a random pattern throughout.

5. The retroreflective article of claim 4 wherein at least one of said elements have errors of about 5 arc minutes or less.

6. The retroreflective article of claim 1 wherein said pairs of elements are arranged in an array of rows and columns.

7. The retroreflective article of claim 1 further including a backing layer.

8. The retroreflective article of claim 1 wherein said elements consist of a polymeric material having an index of refraction of about 1.5, the angle, alpha is about 2° to 5°, and the height, "h" is about 25 μm to 100 μm.

9. The retroreflective article of claim 1 wherein the optical axes of the cube-corner retroreflective elements in adjacent pairs are coplanar.

* * * * *